No. 669,677. Patented Mar. 12, 1901.
W. J. BRAY.
LUGGAGE CARRIER FOR BICYCLES.
(Application filed Dec. 18, 1899.)
(No Model.)
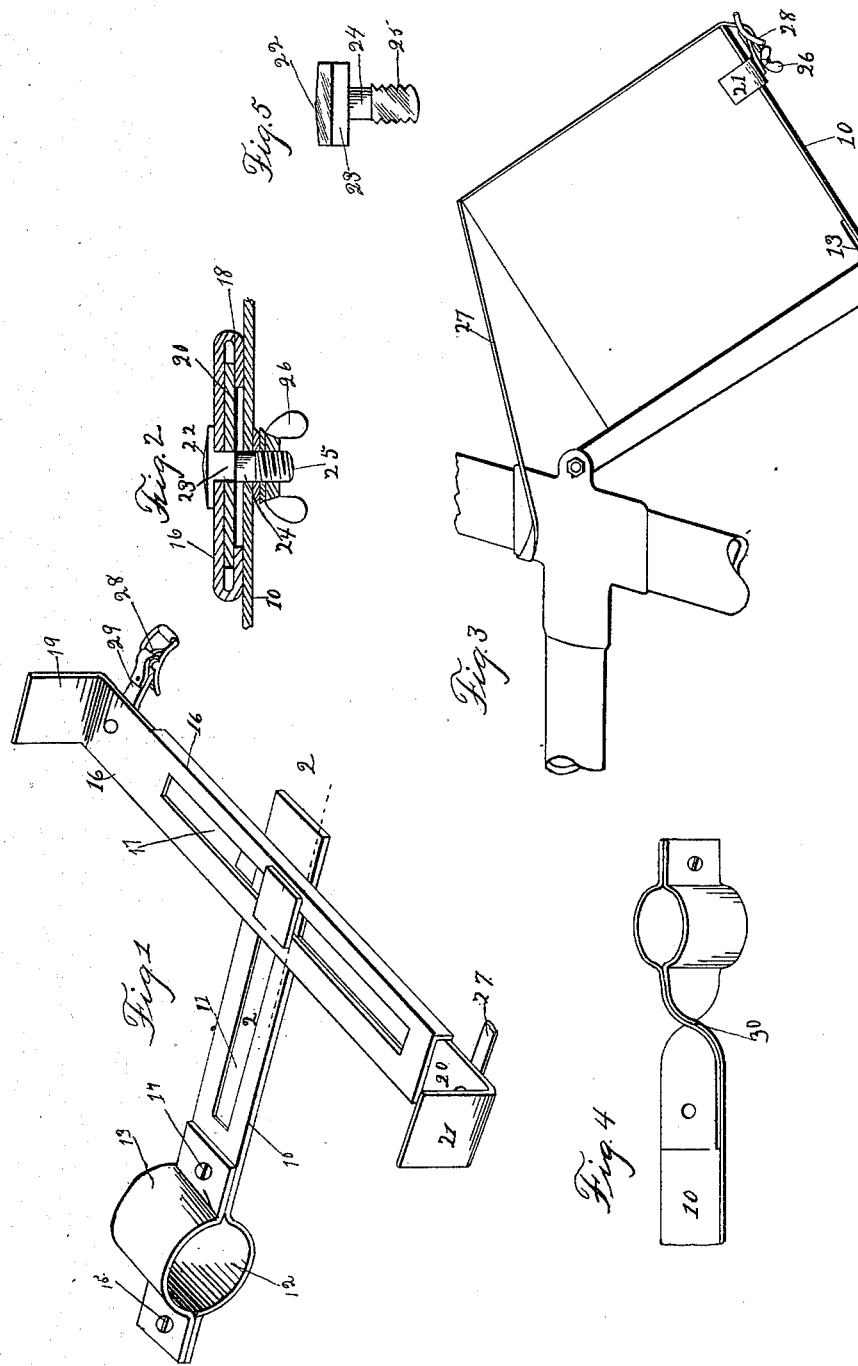
Witnesses:
F. C. Stuart.
R. S. Orwig.
Inventor: Walter J. Bray.
By J. Ralph Orwig Atty

UNITED STATES PATENT OFFICE.

WALTER J. BRAY, OF DES MOINES, IOWA, ASSIGNOR, BY DIRECT AND MESNE ASSIGNMENTS, TO OTTO MILLER AND FREDERICK WIENEKE, OF CHICAGO, ILLINOIS.

LUGGAGE-CARRIER FOR BICYCLES.

SPECIFICATION forming part of Letters Patent No. 669,677, dated March 12, 1901.

Application filed December 18, 1899. Serial No. 740,658. (No model.)

*To all whom it may concern:*

Be it known that I, WALTER J. BRAY, a citizen of the United States, residing at Des Moines, in the county of Polk and State of Iowa, have invented a new and useful Luggage-Carrier for Bicycles, of which the following is a specification.

My invention pertains to luggage-carriers for bicycles; and its object is to provide a novel, inexpensive, and efficient luggage-carrier which shall be capable of attachment to the frame of a bicycle, either behind the seat-post or on the steering-head, and which shall be capable of adjustment to accommodate different lengths and widths of bundles, boxes, or other similar luggage, such carrier being capable of ready attachment and adjustment by the bicycle-rider and adapted to securely hold the luggage upon the bicycle-frame.

The various advantages in construction and operation of my carrier will be apparent from the description hereinafter given.

In the accompanying drawings, Figure 1 is a view in perspective of one embodiment of my invention and showing a carrier adapted for attachment to the bicycle-frame behind the seat-post; Fig. 2, a section on line 2 2 of Fig. 1; Fig. 3, an elevation of a portion of a bicycle-frame, showing my carrier in place and holding a box or the like; Fig. 4, a perspective of a modified form of construction of one part of the carrier-frame, which is adapted for attachment to the steering-head of a bicycle or to the bicycle-frame behind the seat-post in that style of bicycle-frame having a straight tube and crown above the forks of the rear wheel; and Fig. 5, an elevation of a clamping-bolt that may be used.

The carrier comprises, essentially, a strip or member attached to the bicycle-frame and an extensible bar at right angles to said strip and adjustable therein. The inner end of the strip 10 may be attached to the usual cross-bar between the rear forks, preferably in such a way as to be pivoted thereon. As shown, this strip has a curved portion 12 intermediate of its length, adapted, in connection with a clip 13, to fit over the short cross-bar between the rear forks and clamp together and to such cross-bar by means of screws 14 and 15 or otherwise. Obviously any suitable method or construction for attaching the end of this strip to the frame of the bicycle so as to secure the desired results may be adopted and come within the scope and meaning of my invention and claims, the construction shown being intended as one way in which the attachment may be obtained. The cross bar or brace, which extends substantially at right angles to the strip 10, is made extensible in any suitable manner, and, as shown, this bar comprises a strip 16, having a longitudinal slot 17 and having its edges 18 inturned to form a lip or guide. The other strip 20 has a similar longitudinal slot and is adapted to slide upon the strip 16, its side edges entering in said guides. The strip 16 is provided at one end with an end plate or abutment 19, and the strip 20 is provided at the opposite end or side with a plate or abutment 21. These plates are preferably, though not necessarily, formed as an integral part of the strips, respectively, and as shown they consist of the upturned ends of such strips. It will be understood that any suitable construction whereby the two strips may be caused to slide or move upon each other may be adopted and that the construction shown is simply one which may be adopted to attain the desired end.

To hold the parts already described in adjusted position, any suitable bolt or similar device for entering the slots in the strips 16 and 20 and also in a longitudinal slot 11 in the strip 10 may be used. I prefer to use the peculiar form of bolt shown in Fig. 5 for the purpose, although other suitable means may be adopted. This bolt preferably has a flat head 22, bearing upon the top face of the bar or strip 16 and having straight parallel sides 23, entering the slots in the bars 16 and 20, so as to keep these parts in proper relation. This bolt is also provided with a cylindrical portion 24 and a screw-threaded lower end 25, on which screws a thumb-nut 26. This bolt clamps the two sliding members in adjusted position upon each other and also clamps the same in adjusted position upon the strip toward or away from the bicycle-frame. To accommodate the box, package, or other luggage, the screw may be first loosened and the sliding members extended upon each other and the whole cross-bar adjusted outwardly sufficiently, whereupon the package may be placed upon the carrier-frame and the sliding members are forced inwardly upon each other, so that the end bolts or abutments will press against the sides of the package or box, preferably pressing against the outer lower corners thereof by the adjustment of the cross-bar outward on the strip. The clamping-bolt is then tightened, thereby holding the sliding members rigidly in such adjusted position and also holding them in adjusted position in the slot of the strip. The carrier just described forms the support for the package, and in order to secure the same to the carrier and to the bicycle-frame in a secure manner I employ a strap 27 or other suitable or equivalent device, which strap is fastened at one end to the member 20 and passes around some portion of the frame, whereby it engages the same, and then back to a buckle 28 or equivalent device, which may be fixed to a short strap 29 on the end of the member 16. A single strap is preferably used for the purpose, and the luggage is thereby held securely in position. When the strap is drawn tight, the whole carrier, being pivotally attached to the bicycle-frame, is capable of swinging upward and inward, so that the luggage will be caused to operate also against the frame, and thereby be securely held.

My invention is also applicable for use on that type of bicycle-frame which does not possess the usual two rear forks extending up to the seat-post, with a small cross-bar therebetween, just above the rear wheel. This particular type of frame referred to has a single post or tube extending from the seat-post and connected with two rear forks by means of a crown just over the rear wheel. To accommodate this type of bicycle and also to permit of the application of my carrier to the steering-head of any bicycle, I make the strip as shown in Fig. 4 of the drawings, which is substantially the same as the strip 10, with its clamping member 13, except that it has a right-angled twist at the point 30, thereby giving the clamp a vertical position and the flat portion of the strip 10 a horizontal position. In connection with this modified form of construction essentially the same cross-bar as shown in Fig. 1 may be adopted.

When not in use, the parts may be folded into small compass on the bicycle, by reason of the sliding of the members of the cross-bar upon each other and also by reason of the adjustment thereof on the strip, the cross-bar being adapted to be turned in parallel position with the strip. Obviously the device can also be thus folded into small compass when not on the wheel, which is a matter of considerable advantage in transportation and packing of the same.

It will be understood that my device is not limited to the carrying of any particular article, but is adapted to carry luggage generally, whether in the form of boxes or packages, regular or irregular in shape; nor is my invention to be limited to the particular form of means of attachment which are herein shown simply as one embodiment, and not as the only one, inasmuch as other obvious mechanical constructions may be adopted, as the sole purpose of such means is to attach the inner end of the strip to the bicycle-frame, preferably in such a way that the strip is pivotally attached.

Although I have described more or less precise forms and details of construction, I do not intend to be understood as limiting myself thereto, as I contemplate changes in form, the proportion of parts, and the substitution of equivalents as circumstances may suggest or render expedient and without departing from the spirit of my invention.

I claim—

1. A carrier for bicycles comprising a strip attached to the bicycle-frame and extending in the plane of the wheels and having a longitudinal slot, an extensible cross-bar comprising two members sliding on each other and provided with longitudinal slots and means for clamping such members through said slots and said strip together and in adjusted positions.

2. A carrier for bicycles comprising a strip attached to the bicycle-frame and extending in the plane of the wheels, and having a longitudinal slot, an extensible cross-bar comprising two members slidable upon each other and provided with longitudinal slots, such bar having end plates and a bolt through the slots for clamping the strip and members of the bar together and in adjusted positions.

3. A carrier for bicycles comprising a strip pivoted to the bicycle-frame, extending rearwardly and provided with a longitudinal slot, a cross-bar comprising two members slidable upon each other and having registering longitudinal slots, a single clamping-bolt passing through all of said slots to hold the sliding members in adjusted positions on each other and to hold said members in adjusted positions on said strip and a strap engaging the bicycle-frame and connected to the two ends of the bar.

4. A carrier for bicycles comprising a strip attached to the bicycle-frame and extending therefrom in the plane of the wheels, and provided with a longitudinal slot, an extensible cross-bar at right angles to the strip and composed of two members having registering longitudinal slots, a clamping-bolt having a head, a flat-sided portion entering the slots of such members, a round portion passing through the slot of the strip and finally a screw-threaded portion, and a nut for said bolt.

5. A carrier for bicycles comprising a strip attached to, but having a movement upon, the bicycle-frame, and provided with a longitudinal slot, an extensible cross-bar secured at right angles to the strip and having end plates, such bar comprising two members slidable upon each other and having registering longitudinal slots, one of said members having inturned edges to form a guide for the other member, a bolt for clamping the strip and bar together and in adjusted positions and a strap connected to the carrier and engaging the bicycle-frame.

WALTER J. BRAY.

Witnesses:
F. C. STUART,
J. RALPH ORWIG.